FIG.1
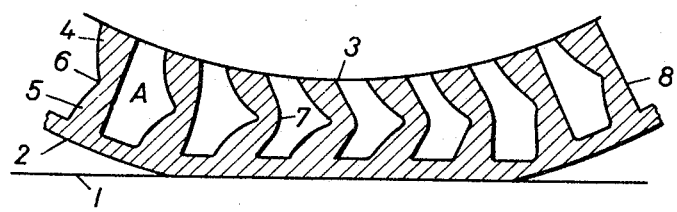
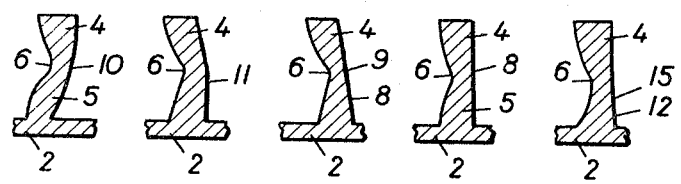
FIG.2a FIG.2b FIG.2c FIG.2d FIG.2e
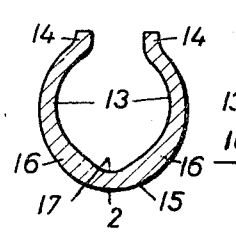 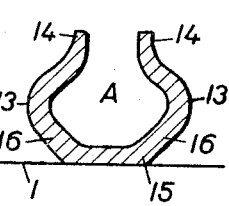 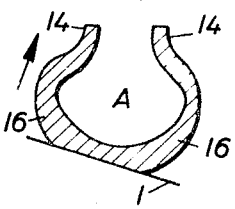
FIG.3   FIG.4   FIG.5

United States Patent Office 3,311,149
Patented Mar. 28, 1967

3,311,149
HOLLOW ELASTIC WHEEL TIRE
Alf Ivar Francis Mathiesen, Kittel Nielsens Vei 61,
Nordstrandshogda, Oslo, Norway
Filed June 16, 1965, Ser. No. 464,432
8 Claims. (Cl. 152—7)

This invention concerns a hollow elastic wheel tire having transverse walls arranged around its whole circumference, said walls dividing the tire cavity circumferentially into cells evenly distributed around the tire and defined by both side walls running circumferentially, and the tread, said transverse walls substantially following the radii of the tire.

Tires of this kind are known in the art, and have the disadvantage that it is not possible to control the way in which the walls will flex under load, which is again important since the main part of the energy stored in the walls when loaded is to be given back in the form of a forward push during rolling of the wheel. When these walls are bent backwardly with normal direction of rotation of the wheel, they will not give off their stored energy to the same extent as when bent forwardly, and the object of the invention is to be able to control this bending of the walls.

According to the invention each of said transverse walls are provided with a recess on the side which is forward with normal direction of rotation of the wheel, and located parallel with the axis of the wheel.

The front of the transverse walls may be curved in the forward direction, or be plane, and in the latter case the plane front of the transverse walls may follow the radius, or may be declined in the rearward direction of vehicle motion.

Specific embodiments of the invention will now be described by way of examples with reference to the accompanying drawings, in which:

FIGURE 1 shows a part of the tire in a loaded condition, in section through its central plane at right angles to the wheel axle.

FIGURES 2a–2e show various designs of these dividing walls.

FIGURE 3 shows a cross section of the tire at right angles to its centre line.

FIGURE 4 shows a corresponding cross section but under load, compressed against the roadway.

FIGURE 5 shows the same cross section during the rolling of the wheel on a sloping roadway, on a sharp bend.

As shown in FIGURE 1, 1 is a normal horizontal roadway, 2 is the circumferential tread of the tire, 3 is the radially inner surface of the tire, in place against a wheel rim, 4, 5 are transverse walls of the tire, dividing the cavity of same in a number of cells. According to the invention said transverse walls have on their forward side (considered in the direction of the normal direction of rotation of the wheel on the roadway) a sharp centrally arranged recess 6. The front of the dividing wall can have a complementary bend, but curved at the middle, 7 (FIGURE 1) or this front side can be plane as shown at 8 and be directed towards the wheel axle (see also FIGURE 2a).

The front 8 of each dividing wall 4, 5 can coincide with the radial plane in question, as partially appearing from FIGURE 1, see also FIGURE 2d. A number of variations are shown in FIGURES 2a to 2e. FIGURE 2c shows at 8 that the front is plane but is inclined in relation to a radial plane. FIGURES 2a, 2b and 2e show at 10, 11 and 12 respectively, variations in the design of the rear of the dividing wall.

Especially FIGURE 2e shows an embodiment in which the front 15 of the wall is slightly concavely curved with gradually increasing curvature in direction towards the tread so that said curvature will be greatest at 12.

As is apparent from FIGURES 3 and 4 the tire cross section has varying thickness of material. From the middle at 13 to the rim at 14 it is thinnest, while the central radially outermost part of the tread 2 is thickened, the greatest thickness being at the outer portions 16.

By means of these measures the outer or lower portion 5 of the transverse walls 4, 5, i.e. below the recess 6, will be reinforced more than the inner or upper portion 4, i.e. above said recess 6.

For fast vehicles the outer or lower portion 5 of the dividing walls is as shown in FIGURE 1. This achieves an increased pressure effect against the roadway 1, but it is more constant. In the design shown in FIGURE 2c the pressure acts faster and longer.

In sharp curves on sloping roadway 1 the tire has a tendency to be drawn off the rim at 14 (FIGURE 5). This is prevented by forming the cross section A of the cells with a sharper curvature at the periphery of the tire as shown at 17 in FIGURE 3, so that the radially outermost half of the cross section is reinforced or stiffened at 16. Thus the cross section shown in FIGURE 5 will be reinforced at the point where the greatest bending out occurs, and at the inside of the curve the tire will be pressed in towards the base of the rim. At 16 further reinforcement can be effected, e.g. by the addition of multiply cord.

The shape of the cells A as shown in FIGURE 3 is approaching a triangle and will also ensure that the movement of the air inside the tire during rolling on the roadway will be relatively small which results in a reduction of development of heat in the tire, there being obtained a triangle effect.

Preferably the number of transverse dividing walls in the tire described heretofore, is increased as compared with what appears from FIGURE 1, the dimensions of the walls in the transverse direction being correspondingly reduced. Furthermore, the cells can be in communication with each other (not shown) so that the internal tire pressure can be varied by ordinary inflation.

What I claim is:

1. In a hollow elastic wheel tire having an outer periphery with treads running therearound and side walls having cells therebetween, the improvement comprising, a plurality of transverse walls defining said cells integral with said side walls and spaced about the circumference of said tire such that each of said transverse walls are radially disposed about the circumference relative to the axis of rotation of said wheel, each of said transverse walls having a forward moving face relative to the direction of rotation of said wheel and a complementary rearward face, each of said forward moving faces being provided with a substantially sharp recess intermediate the top and bottom of said transverse walls which run parallel with the axis of said wheel across the side walls of said tire, whereby when the tire is subjected to a load during the rotation of said wheel on a surface, energy stored during compression of the tire is released in the form of a forward push during the rolling of the wheel on said surface.

2. A tire as claimed in claim 1, wherein the complementary rearward face of each transverse wall has a convex curve.

3. A tire as claimed in claim 1, wherein the complementary rearward face of each transverse wall is a plane face.

4. A tire as claimed in claim 3, wherein the said plane face of each transverse wall follows the radius at the place in question.

5. A tire as claimed in claim 3, wherein the said plane face of each transverse wall is declined in the rearward direction relatively to the radius at the place in question.

6. A tire as claimed in claim 1, wherein said cells when seen in an axial plane, have a cross section so formed that the curvature of the side walls of the tire is greatest at the central portion between the wheel rim and the tire tread.

7. A tire as claimed in claim 6, wherein the cells, when seen in an axial plane, have such a cross section that the curvature of the side walls is greatest nearest the tread, and that the stiffness of the material of the tire is greatest at the sectional parts lying between the tire tread and the area of the greatest width of the tire, so that the tire cross section under load is bending out more pronouncedly at the middle of said cross section.

8. A tire as claimed in claim 6, wherein the side walls have their greatest curvature close to the tread in the outer half of the tire whereby the internal volume will be approximately constant during operation.

References Cited by the Examiner

UNITED STATES PATENTS

| | | | |
|---|---|---|---|
| 2,600,231 | 6/1952 | Ewart | 152—352 |
| 3,219,090 | 11/1965 | Cislo | 152—7 |
| 3,237,672 | 3/1966 | McMannis | 152—352 |

FOREIGN PATENTS

| | | |
|---|---|---|
| 796,113 | 6/1958 | Great Britain. |
| 948,265 | 1/1964 | Great Britain. |

ARTHUR L. LA POINT, *Primary Examiner.*

C. W. HAEFELE, *Assistant Examiner.*